United States Patent [19]

Clement

[11] 4,022,717
[45] May 10, 1977

[54] MOLYBDENUM CATALYZED OXIDATIVE COUPLING POLYMERIZATION OF ARENES IN LIQUID HYDROGEN FLUORIDE

[75] Inventor: Robert Alton Clement, Wilmington, Del.

[73] Assignee: E. I. Du Pont de Nemours and Company, Wilmington, Del.

[22] Filed: June 24, 1974

[21] Appl. No.: 482,575

[52] U.S. Cl. .............................. 260/2 H; 260/670
[51] Int. Cl.² ...................................... C08G 61/10
[58] Field of Search ................................. 260/2 H

[56] References Cited
UNITED STATES PATENTS

| | | | |
|---|---|---|---|
| 3,386,899 | 6/1968 | Shepard et al. | 260/2 H |
| 3,480,568 | 11/1969 | Weichman et al. | 260/2 H |

OTHER PUBLICATIONS

"Polymerization of Benzene to p-Polyphenyl by Molybdenum Pentachloride", Kovacic, P. et al., J. Organic Chem. vol. 28, April 1963, pp. 968–972.

*Primary Examiner*—Wilbert J. Briggs, Sr.

[57] ABSTRACT

Arene polymers can be made by oxidative coupling of arenes of at least 10 carbons, optionally with benzene, using liquid hydrogen fluoride, a catalytic amount of a molybdenum compound and oxygen as the oxidant.

9 Claims, No Drawings

MOLYBDENUM CATALYZED OXIDATIVE COUPLING POLYMERIZATION OF ARENES IN LIQUID HYDROGEN FLUORIDE

BACKGROUND OF THE INVENTION

1. Field of the Invention

This invention relates to a new process for preparing aromatic hydrocarbon polymers.

More specifically, it relates to a process for preparing polyarylenes by the catalytic oxidative polymerization of arenes and combinations of different arenes.

2. The Prior Art

It is known that polyarylenes in general, and poly(p-phenylene) in particular, have excellent resistance to thermal, oxidative, and radiative degradation, and these characteristics are reflected in their utility as solid lubricants, lubricant additives, insulators, pigments, ablative materials, oxidation inhibitors, stabilizers against heat and light, and laminate binders for heat shields.

Larson & Moore, Inorg. Chem. 5, 801 (1966) disclose the reaction of refluxing benzene with $MoOCl_4$ to give poly(p-phenylene). The reaction is stoichiometric, not catalytic, the yield is 40% based on $MoOCl_4$, and the product is contaminated with significant amounts of chlorine (4.46%) and molybdenum (3.64%).

Omae & Hirabashi, Jap. Pat. No. 2,280/67, published Feb. 1, 1967, disclose the reaction of benzene with oxygen in the presence of molybdenum pentachloride and boron trifluoride at 80° C in an autoclave to give a brown polymer. Although the $MoCl_5$ is said to be a catalyst, 81.9 g of $MoCl_5$ is used with 156 g of benzene, and the yield of polymer (assumed to be poly(p-phenylene) is only 46% based on $MoCl_5$ as a stoichiometric oxidant. Furthermore, only 0.0035 g of polymer per mmol of Mo is obtained.

Shepard & Dannels U.S. Pat. No. 3,386,899 (1968) disclose the polymerization of benzene and polycyclic aromatic hydrocarbons by anodic oxidation in liquid hydrogen fluoride. Molybdenum anodes are disclosed. Benzene is the monomer in most of the examples, and the highest yield of polymer therefrom is 36%. Conversion of o-terphenyl to a solid polymer in 22% yield is disclosed, but the products from naphthalene and biphenyl are described as "viscous condensation products".

U.S. Pat. No. 3,547,790 is a division of the foregoing patent.

Weichman & Walsh U.S. Pat. No. 3,480,568 (1969) disclose the conversion of benzene to poly(p-phenylene) by oxygen in the presence of a $CuCl_2/AlCl_3$ catalyst. The maximum catalytic yield is only 197.5%, i.e., slightly less than twice the theoretical amount of polymer obtainable with $CuCl_2$ as a stoichiometric oxidant. The yield of polymer can also be expressed as 0.075 g per mmol of Cu.

Frevel et al. U.S. Pat. No. 3,494,877 (1970) disclose a process for polymerizing aromatic hydrocarbons such as benzene, biphenyl, and naphthalene by reaction with oxygen in the presence of a palladium catalyst, aqueous sulfuric acid, and a large excess of a metal sulfate capable of oxidizing Pd(0) to Pd(2). Sulfates of iron and vanadium are disclosed as oxidants. The products, however, appear to be low in molecular weight.

Bilow & Rust U.S. Pat. No. 3,565,832 (1971) disclose the conversion of aromatic hydrocarbons, including mixtures of hydrocarbons, to polymers by reaction with oxygen in the presence of Lewis-acid catalysts such as $BF_3$, $FeCl_3$, $TaCl_5$, $ZrCl_4$. In addition, it is disclosed that an oxidant such as cupric chloride, silver oxide, or vanadium pentoxide can be used with the Lewis acid. There is no disclosure of molybdenum compounds as catalysts or oxidants.

Related patents issued to Bilow et al. and containing essentially the same disclosures include the following: U.S. Pat. Nos. 3,578,611; 3,582,498; 3,595,811; 3,677,976; 3,678,006;

Yoshimoto and Itatani, Bull. Chem. Soc. Jap. 46 (8), 2490 (1973), disclose reaction of naphthalene with 1:1 nitrogen:oxygen in the presence of palladium acetate and acetylacetone at 150° C for four hours to give a mixture of isomeric binaphthyls. The nitrogen:oxygen mixture was introduced at 50 $kg/cm^2$ at room temperature, so the starting partial pressure of oxygen at 150° C was at least 345 psi. There is no disclosure of polymer formation. Other aromatic compounds gave similar coupling reactions.

Kovacic and Lange, J. Org. Chem. 28 968 (1963), disclose reaction of benzene with molybdenum pentachloride in the presence of water or titanium tetrachloride as cocatalyst to give "p-polyphenyl" (poly(p-phenylene)). The reaction is stoichiometric, not catalytic. When water was the cocatalyst, the yields were about 6–13% and the products contained 2.7–9% Cl. When $TiCl_4$ was the cocatalyst, the yields were 17–28% and the products contained 10–20% Cl.

Kovacic and Oziomek, Macromolecular Syntheses 2, 23 (1966), disclose polymerization of benzene to poly(p-phenylene) in the presence of aluminum chloride and cupric chloride. To date all these methods have suffered from one or more of the following disadvantages:

a. They consume electric power, which is in great demand and short supply.

b. They consume large amounts of chemical oxidants; the reduction products of these oxidants must be removed from the polymer and reclaimed and/or discarded.

c. They give polymers containing metallic residues that may be toxic or deleterious to the properties of the polymer.

d. They require recovery of precious-metal catalysts.

e. They are inefficient in terms of moles of carbon-carbon bonds formed per mole of catalyst.

f. In some instances only low molecular weight products are obtained.

SUMMARY OF THE INVENTION

It has now been discovered that polyarenes can be made by contacting and reacting at least one arene in liquid hydrogen fluoride with oxygen in the presence of a catalytic amount of a molybdenum compound soluble in the reaction medium at a temperature between 0° and 120° C, with the proviso that at least one said arene has at least 10 carbon atoms.

An "arene" is defined here as a wholly cyclic, wholly aromatic hydrocarbon, free of nonaromatic substituents, in which any carbon bears at most one hydrogen. The simplest arene is benzene. Higher arenes containing two or more benzene rings include those in which the rings are joined by carbon-carbon single bonds, e.g., biphenyl, the isomeric terphenyls, and the isomeric triphenylbenzenes; condensed aromatic hydrocarbons containing fused rings, such as naphthalene, phenanthrene, and pyrene; and compounds containing both fused and singly bonded rings, such as the isomeric binaphthyls and the isomeric phenylanthracenes.

A "polyarylene" is defined here as a polymer in which the (repeating) units are bivalent groups derived by removal of two hydrogens from each of one or more arenes (for linear polymers) or trivalent or higher-valent groups derived by removal of three or more hydrogens therefrom (for network polymers).

In accordance with widespread usage, the arenes that are used as starting materials to make the polymers will be referred to as "monomers" and "comonomers". (More strictly speaking, they function as "condensants" and "cocondensants", since they lose hydrogen in the oxidative polymerization process.)

It will be apparent that a number of compounds, e.g., p-sexiphenyl, fit the definitions of both arenes and polyarylenes. In the present description, any composition that is used as a starting material in the process of the invention, as is p-sexiphenyl, will arbitrarily be referred to as an arene, i.e., a monomer or comonomer.

Benzene alone is polymerized to only a minor extent by the process of this invention, although naphthalene, biphenyl and higher arenes can be readily polymerized and will copolymerize with benzene. Accordingly, it is necessary that at least some of the arene monomers be other than benzene i.e. have 10 or more carbon atoms.

The process of the invention incorporates significant improvements over known processes for the synthesis of polyarylenes by the oxidative polymerization of arenes. These improvements can be classified as follows:

a. The process is an efficient catalytic process in that up to 50 or more moles of carbon-carbon bonds can be formed per mole of molybdenum catalyst in copolymerizations involving excess benzene as a comonomer.

b. The ultimate oxidant is air or oxygen, which provides most significant economic advantages both with regard to cost of oxidant and ease of processing.

c. Because only small quantities of inorganic substances, namely molybdenum and fluorine, are present in the crude polymer, the economic and processing disadvantages associated with the removal of large quantities of inorganic material which must be reclaimed or discarded are obviated.

d. Since only catalytic quantities of molybdenum compounds are required such as molybdenum dioxide and molybdenum trioxide which are relatively cheap, and exhibit minimal toxic properties, it is not necessary to process the crude polyarylene for removal of molybdenum residues except for those applications where their presence is demonstrably detrimental.

e. Since polyarylenes can be produced by the oxidative copolymerization of a higher arene with benzene, polyarylenes can be produced in which the bulk of the product is derived from benzene, which is cheaper than any of the higher arenes.

DETAILED DESCRIPTION OF THE PROCESS

The process of the invention consists in contacting and reacting at least one arene containing at least ten carbons, optionally together with benzene, with oxygen in liquid hydrogen fluoride in the presence of a catalytically active amount of a molybdenum-containing composition that is significantly soluble in the reaction mixture, at a temperature of at least 0° C and at atmospheric or superatmospheric pressure, to produce a polyarylene. At the conclusion of the polymerization process, evaporation of volatile materials (hydrogen fluoride, water produced in the reaction, and excess benzene, if present) and washing with an organic solvent (to remove lower-molecular-weight material) afford a polyarylene product contaminated only with residue from the molybdenum catalyst, and the bulk of this residue can be removed simply by leaching with hot water.

Arenes that can be used as monomers or comonomers in the process are unsubstituted, completely aromatic hydrocarbons containing from 10 and preferably up to about 36 carbons. Examples are biphenyl, o-terphenyl, m-terphenyl, p-terphenyl, the quaterphenyls such as p-quaterphenyl and the triphenylbenzenes, the quinquephenyls, the sexiphenyls such as p-sexiphenyl and the diphenylquaterphenyls, naphthalene, anthracene, phenanthrene, chrysene, pyrene, triphenylene, naphthacene, the dibenzanthracenes, the phenylnaphthalenes, the binaphthyls, and the biphenylylanthracenes. In addition, benzene can be used as a comonomer with any of the arenes defined above.

For reasons of availability, the arenes preferably contain at most about 24 carbons per molecule. The cheapest and most readily available arenes are benzene, naphthalene, biphenyl, and the terphenyls, and therefore these arenes constitute an especially preferred class.

When two or more arenes other than benzene are used as comonomers, they are usually converted substantially completely to polymer. Accordingly, the mole or weight ratio of such arenes is selected to correspond to the mole or weight ratio of repeating units derived from the arenes in the polymeric product. When benzene is used as a comonomer, the objective is usually to incorporate as many phenylene units as possible into the polymer from the benzene. Therefore, an excess of benzene is normally used under such circumstances. Usually at least twice as much benzene by weight as any other one arene is used; in practice about 10–30 times as much benzene is used. This large excess insures incorporation of as many as possible units derived from the cheap benzene in the polymer and also helps to insure fluidity of the reaction mixture.

Solubility in the reaction medium is believed to be the key requirement for catalyst activity. It is believed that any molybdenum composition that can provide a molybdenum species soluble in hydrogen fluoride under conditions of the reaction will be an active catalyst for the process. Unfortunately, this property is difficult to determine in independent experiments, since hydrogen fluoride is hard to work with and since factors such as oxygen pressure and the presence of potential arene ligands could also affect solubility of the molybdenum composition.

Active catalysts include oxides, such as molybdenum dioxide and molybdenum trioxide; halides and oxyhalides, such as molybdenum dibromide, molybdenum diiodide, molybdenum dioxydichloride, molybdenum hexachloride, molybdenum oxytetrachloride, molybdenum pentabromide, and molybdenum pentachloride; molybdates, halomolybdates, and cyanomolybdates, such as ammonium molybdate, ammonium paramolybdate, barium molybdate, cadmium molybdate, calcium molybdate, copper molybdate, lead molybdate, lithium molybdate, magnesium molybdate, manganese molybdate, nickel molybdate, potassium hexachloromolybdate, potassium molybdate, potassium octacyanomolybdate, sodium molybdate, strontium molybdate, zinc molybdate, and zirconium molybdate;

molybdenum-containing hetero acids and salts thereof, such as ammonium 12-molybdophosphate, ammonium 12-molybdosilicate, 12-molybdophosphoric acid, 12-molybdosilicic acid, phosphomolybdic acid, sodium 12-molydophosphate, sodium 12-molybdosilicate, sodium phosphomolybdate, and sodium silicomolybdate; other binary molybdenum compounds, such as molybdenum carbide, molybdenum disilicide, and molybdenum nitride; carbonyl complexes and $\pi$-hydrocarbon complexes of molybdenum, such as bicyclo[2.2.1]hepta-2,5-dienemolybdenum tetracarbonyl, cycloheptatrienemolybdenum tricarbonyl, cyclopentadienylmolybdenum tricarbonyl dimer, methylcyclopentadienylmolybdenum tricarbonyl dimer, dicyclopentadienylmolybdenum dichloride, benzenemolybdenum tricarbonyl, dibenzenemolybdenum, and molybdenum hexacarbonyl; and chelates derived from 1,3-dicarbonyl compounds, such as molybdenyl bis(acetylacetonate) [dioxobis(2,4-pentanedionato)molybdenum], molybdenum tris(acetylacetonate), and molybdenyl bis(dibenzoylmethanate). The preferred catalyst is molybdenum trioxide.

The amount of molybdenum-containing catalyst will usually be at least about 0.01 mole per mole of arene or arenes other than benzene. Actually, any amount of molybdenum compound can be used as long as it provides a catalytic effect, and sometimes such an effect will be observed with less than 0.01 mole of catalyst per mole of arene. There is seldom any advantage in using more than 0.25 mole of catalyst per mole of arene. The usual range, therefore, will be between about 0.01 mole and about 0.25 mole of catalyst per mole of arene or arenes other than benzene.

The reaction involved in the process will proceed with oxygen at atmospheric pressure, and pressures up to about 2,000 psi or even higher can be used. In practice it is found that a pressure of about 100 psi is required for the process to operate at a reasonable rate. The broad range of operable pressure is therefore between atmospheric pressure and 2,000 psi or higher, the preferred range being between about 100 psi and 1,000 psi. Pure oxygen is not required, and oxygen in the form of air is equally operable. If air is used, the total pressure will be about five times that used with pure oxygen, in order to provide an equivalent partial pressure of oxygen.

Operable temperatures for the process lie between about 0° and 120° C, the preferred range being about 40–100° C. The exact temperature will depend to some extent on other variables such as the arene or arenes, the catalyst, and the oxygen pressure. Raising the temperature, e.g., in the copolymerization of p-terphenyl with benzene, tends to increase the yield of polymer, and also the degree of polymerization (DP) (as indicated by the "ir index"; see below). However, increasing the temperature beyond a certain point also tends to increase the carbon-hydrogen ratio in the polymeric product, probably corresponding to the increased introduction of condensed polycyclic aromatic units and therefore a decrease in linearity. The latter effect is not especially detrimental for some applications.

Usually at least 0.25 hr is required for appreciable reaction, and there are few if any embodiments of the process that require more than 24 hours. As was noted in connection with temperature, the reaction time will vary to some extent depending on other variables. Increasing the time, e.g., in the copolymerization of p-terphenyl with benzene, tends to increase the yield of polymer and its DP. However, increasing the time beyond a certain point or range tends to increase the carbon-hydrogen ratio in the product, as does increasing the temperature beyond a certain point. The usual time for operating the process will be between one hour and 16 hours.

Hydrogen fluoride is an essential component of the reaction mixture. The weight ratio of hydrogen fluoride to arene or arenes other than benzene can vary widely, i.e., between about 1 and 1000. Usually a substantial excess of hydrogen fluoride is used, in order both to realize the maximum degree of its cocatalytic activity and to help insure good fluidity. The usual amount of hydrogen fluoride is between about 5 and 100 times the weight of the arene or arenes other than benzene. The hydrogen fluoride need not be anhydrous, and can in fact contain up to about 35% water. However, since anhydrous hydrogen fluoride is readily available commercially, it is normally used.

CHARACTERIZATION OF THE PRODUCTS

Characterization of polyarylenes is difficult, because they are devoid of functional groups and are, in many instances, totally insoluble and infusible. DTA (differential thermal analysis), TGA (thermogravimetric analysis), and measurements of the tensile strengths of cold-pressed tensile bars can be used to characterize the physical properties of polyarylenes as polymeric materials. Elemental analysis and ir* analysis, however, are the only generally applicable methods for characterizing polyarylenes as chemical compositions of matter.

*infrared

Within limits, elemental composition provides evidence for gross chemical structure and DP (degree of polymerization). Thus, the elemental compositions, normalized on carbon, of selected compounds ranging from polyphenylene of infinite chain length to benzene, and containing only benzene rings bonded through carbon-carbon single bonds, vary as follows:

| Compound | Formula $C_6H_5(C_6H_4)_nH$, n = | Composition $C_{6.00}H_x$, x = |
|---|---|---|
| polyphenylene | ∞ | 4.00 |
| decaphenyl | 9 | 4.20 |
| sexiphenyl | 5 | 4.33 |
| quaterphenyl | 3 | 4.50 |
| terphenyl | 2 | 4.67 |
| biphenyl | 1 | 5.00 |
| benzene | 0 | 6.00 |

Elemental composition is not a sensitive measure of DP except for polymers of low DP, and it cannot distinguish between linear and network polymers. For homopolymers, elemental composition can provide evidence for the integrity of the repeating units. Thus, a polyarylene obtained by the oxidative polymerization of o-terphenyl (1), and with an elemental composition of $C_{6.00}H_{3.75}$, must contain condensed aromatic units, such as those derived from triphenylene (2),

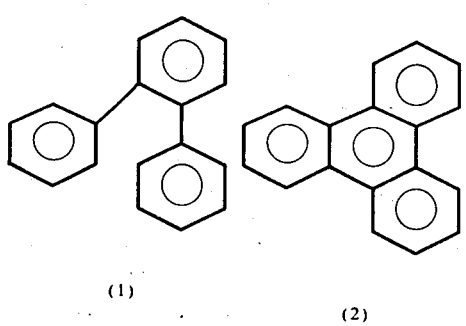

(1)    (2)

in addition to units derived from benzene and linked solely through carbon-carbon single bonds.

Infrared analysis can be used to identify polyarylenes through the absence of absorption associated with the aliphatic C—H bond and through the presence of absorption associated with aromatic structures, most particularly in the region 690 to 900 cm.$^{-1}$. Except for polyarylenes of highly regular structure, however, ir analysis is not useful for detecting the nature of the aromatic monomer unit, or of the orientation of its bonding in the polymer. One conspicuous and important highly regular structure, for which ir analysis is valuable, is poly(p-phenylene).

Very strong absorption at 800-860 cm$^{-1}$ is characteristic of 1,4-disubstituted benzene rings and very strong absorption at 730-770 cm$^{-1}$ is characteristic of monosubstituted benzene rings. It is useful to define an "ir index" as the ratio of the absorbance of the strongest absorption in the 800–860 cm$^{-1}$ region to that of the strongest absorption in the 730–770 cm$^{-1}$ region, and that is the definition of the term "ir index" used here. It is a pure number and in this description is always associated with the actual positions of the two absorptions in cm.$^{-1}$ . For poly(p-phenylenes), the larger the ir index, the greater the number of p-phenylene units (repeating units) relative to the number of phenyl groups (end groups). Hence, the larger the ir index of the poly(p-phenylene), the greater its DP. Actual values of the ir index for poly(p-phenylene) vary from 838/745 = 0.40 for p-terphenyl to 826/754 = 0.80 for p-quaterphenyl to 810/760 = 1.06 for p-sexiphenyl to 805/765 = 6.45 for poly(p-phenylene) prepared by the present process by the oxidative copolymerization of p-sexiphenyl with benzene.

SAFETY STATEMENT

Hydrogen fluoride is hazardous. It produces extremely painful and slow-healing burns. Because of its volatility, proximity to liquid hydrogen fluoride, as well as contact with it, can cause injury. The heat of dilution of hydrogen fluoride in miscible solvents is high enough to produce extensive spattering. It is corrosive toward glass and most metals. It should be handled with extreme care and only in the hood. Protective apparel should be worn at all times.

SPECIFIC EMBODIMENTS OF THE INVENTION

The following examples illustrate the process of the invention, but should not be construed as fully delineating the scope thereof. The methods used for calculating yields and number of carbon-carbon bonds formed per atom of molybdenum are described in Example 1. All elemental analyses are normalized on carbon; i.e., the carbon content is arbitrarily established as $C_{6.00}$, corresponding to the six carbons of one benzene ring, and the relative amounts of other elements are indicated by appropriate subscripts. "Triturated" is defined in Example 1; "leached", in Example 3.

EXAMPLE 1

A. A mixture of 5.0 g of biphenyl, 25 ml of benzene, 0.79 g of molybdenyl acetylacetonate [MoO$_2$(AcAc)$_2$, where AcAc represents the acetylacetonate ligand], and 0.43 g of mercuric oxide was charged to a 200-ml "Hastelloy" C shaker tube. The tube was cooled and evacuated, charged with 75 g of hydrogen fluoride, and heated with shaking to 50° C. It was pressured with oxygen to 300 psi and held at 50° C and 300 psi for eight hours with shaking, with repressuring as necessary. The tube was cooled and opened, and the reaction mixture was allowed to evaporate to dryness. The residual solid was triturated in turn with 200 ml of water and 50 ml of ethyl alcohol. (Here and in later examples, "triturated" means that a mixture of the solid and the named liquid was stirred magnetically and filtered.) After filtration the solid was rinsed on the filter with water and air-dried to give 7.55 g of crude poly(p-phenylene) as a brown powder.

B. Mercuric oxide was shown to be totally unnecessary in the foregoing experiment; the process was duplicated, except that no mercuric oxide was used, and the crude product was rinsed with ethyl alcohol before being air-dried. There was thus obtained 7.92 g of crude poly(p-phenylene) as a light-brown powder. Its infrared absorption spectrum was identical with that of the product of the first experiment.

The average weight of poly(p-phenylene) in the two experiments was 7.74 g corresponding to a 155% yield based on biphenyl. (Here and in later experiments the yield is calculated simply by dividing the weight of polymer by the total weight of arene or arenes other than benzene and multiplying the quotient by 100.)

In the formation of the polymer, an average of 28.5 carbon-carbon bonds per atom of molybdenum were formed. Here and in later examples, this quantity is calculated as follows: It is assumed that the polymer is poly(p-phenylene) of infinite degree of polymerization. It is further assumed that all the biphenyl, $C_{12}H_{10}$, is converted to —$C_{12}H_8$— units in the polymer, and that the remainder of the polymer is made up of —$C_6H_4$— units derived from benzene. The polymer therefore contains 4.93 g, or 32.4 mmol, of —$C_{12}H_8$— units and 2.81 g (7.74 -4.93), or 37.0 mmol, of —$C_6H_4$— units. Since overall, one carbon-carbon bond is formed for each repeating unit, the total of 69.4 mmol of repeating units corresponds to 69.4 mmol of carbon-carbon bonds formed with 2.3 mmol of MoO$_2$ (AcAc)$_2$ catalyst, or 28.5 carbon-carbon bonds per atom of molybdenum.

For further manipulation, crude poly(p-phenylene) from the two experiments was combined into a single sample. This sample was triturated three times with 500 ml of boiling aqueous 18% hydrochloric acid and three times with boiling water and was air-dried to afford 14.84 g of a dark-brown powder. A portion of this powder was extracted with benzene in a Soxhlet extraction apparatus at a rate of about 500 ml/hr for 23 hours and was then blown dry under nitrogen. Purified poly(p-phenylene), thus obtained with 97% recovery, was a brown powder. It had an elemental composition, normalized on carbon, of $C_{6.00}H_{3.78}F_{0.01}O_{0.08}$ afforded 0.10% ash, and had an ir index 807/760 = 2.14. Samples further dried in a vacuum oven at 110° C for 20 hours were subjected to differential thermal analysis (DTA) and thermogravimetric analysis (TGA). The DTA (20° C/min in argon) showed a shallow endotherm at 707° C as the only thermal transition to 800° C. The TGA (6° C/min in air) showed 5% weight loss at 526° C, 10% at 624° C, and 50% at 995° C.

EXAMPLE 2

In the apparatus of Example 1, a mixture of 5.0 g of biphenyl, 25 ml of benzene, 0.58 g of molybdenum trioxide, $MoO_3$, and 75 g of hydrogen fluoride was cold-pressured to 200 psi with oxygen, warmed to 60° C, pressured to 400 psi with more oxygen, and processed for two hours at 60° C and 400 psi. After cooling and evaporation of volatile materials, the solid residue was washed on the filter four times with 100-ml portions of boiling water, washed on the filter four times with 100-ml portions of ethyl alcohol, triturated twice with 100-ml portions of boiling water and dried overnight at 110° C in a vacuum oven. Poly(p-phenylene) (9.13 g) was obtained as a black powder.

For characterization the product was combined with the products from five other identical experiments to form a single composite sample. The average yield of poly(p-phenylene) was 8.65 g (173% on biphenyl; 20.4 C-C bonds per Mo).

The composite sample had an elemental composition, normalized on carbon, of $C_{6.00}H_{3.76}O_{0.17}$ and less than 0.3% F, yielded 0.54% ash, and had an ir index 807/762 = 2.21. DTA (15° C/min in argon) showed endothermal crests at 474° C and 620° C and an endothermal peak at 724° C as the only thermal transitions to 800° C. TGA (6° C/min in air) showed 5% weight loss at 453° C, 10% at 492° C, and 50% at 764° C.

For comparison with Examples 1 and 2, a mixture of 5.0 g of biphenyl, 25 ml of benzene, 75 g of hydrogen fluoride and oxygen with no added molybdenum catalyst was processed by the method of Example 1, and the product was worked up substantially as described in Examples 1 and 2. The product was combined with the products of three similar runs to form a composite sample. The average yield at this stage was 5.80 g (116% on biphenyl), but after extraction with benzene for 23 hours, the extracted product was recovered in only 65% yield. The extracted product had an elemental composition, normalized on carbon, of $C_{6.00}H_{3.63}F_{0.01}O_{0.08}$, afforded 0.36% ash, and had an ir index 809/760 of only 1.15.

EXAMPLE 3

A mixture of 4.60 g of p-terphenyl, 25 ml of benzene, 0.29 g of molybdenum trioxide, 75 g of hydrogen fluoride, and oxygen was processed as in Example 1 at 60° C and 300 psi for 16 hours.

After cooling and evaporation of volatile materials, the residual solid was leached with 500 ml of water. (Here and in later descriptions, the term leached means that the solid and the stated liquid were agitated in a blender and the solid was then separated by filtration). The solid was washed on the filter four times with 100-ml portions of ethyl alcohol, triturated twice with 500-ml portions of boiling water, and dried overnight at 110° C in a vacuum oven, to give 11.47 g of poly(p-phenylene) as a dark-brown powder.

For characterization, the product was combined with another product from an identical run to form a single composite sample. The average yield was 11.41 g (248% on p-terphenyl; 55.0 C-C bonds per Mo). The composite sample had an elemental composition of $C_{6.00}H_{4.02}F_{0.01}Mo_{0.006}O_{0.10}$, yielded 0.20% ash, and had an ir index 805/765 = 4.55.

EXAMPLE 4

A mixture of 23.0 g of p-terphenyl, 125 ml of benzene, 2.88 g of molybdenum trioxide, 375 g of hydrogen fluoride, and oxygen was processed in a Hastelloy C rocker tube at 60° C and 300 psi for eight hours by the procedure of Example 1. The quantities of measured reactants were five times those of Example 3, the catalyst/arene ratio was twice that of Example 3, and the reaction time was half that of Example 3. The product was worked up as in Example 3, twice the volume of washing liquids being used, to give 61.89 g of poly(p-phenylene) as a brown powder (269% on p-terphenyl; 30.6 C-C per Mo). The product had the elemental composition $C_{6.00}H_{4.03}F_{0.01}Mo_{0.007}O_{0.15}$, gave 1.54% ash, and had an ir index 805/765 = 3.71. Tensile bars were cold-pressed from this material to 100 mils thickness at 30 tons/in². They had a tensile strength of 1430 ± 193 psi, a tensile modulus of 499 ± 45 × 10³ psi, and an elongation at break of 0.33 ± 0.06%.

EXAMPLE 5

A mixture of 8.0 g of p-terphenyl, 25 ml of benzene, 75 g of hydrogen fluoride, 1.30 g of molybdenyl acetylacetonate, and oxygen was processed at 60° C and 400 psi for two hours by the method of Example 2. After cooling and evaporation of volatile materials, the residual solid was leached with 400 ml of water, washed on the filter four times with 100-ml portions of boiling water and four times with 100-ml portions of ethyl alcohol, and air-dried, to give 13.40 g of poly(p-phenylene) as a yellow-brown powder.

The product was combined with the products of two other identical runs. The average yield of poly(p-phenylene) was 13.12 g (164% on p-terphenyl; 25.9 C-C per Mo). The combined product was triturated twice with 300-ml portions of boiling water and dried in a vacuum oven overnight at 110° C. It was then extracted with benzene in a Soxhlet apparatus for 23 hours at a rate of about 500 ml/hr and dried in a vacuum oven at 110° C overnight. It was recovered in 98% yield. This sample of poly(p-phenylene) had an elemental composition $C_{6.00}H_{4.14}F_{0.006}O_{0.09}$, gave 0.24% ash, and had an ir index 807/765 = 2.70.

The procedure of Example 5 was repeated, except that no molybdenum-containing catalyst was charged. The product was 9.78 g of a light-brown powder; the average yield from three such runs was 9.74 g (122% on p-terphenyl). The combined product, after further trituration and extraction with benzene (96% recovery) had the elemental composition $C_{6.00}H_{4.20}F_{0.003}O_{0.02}$, gave 0.10% ash, and had an ir index 816/760 of only 0.88.

EXAMPLE 6

A mixture of 4.60 g of p-terphenyl, 25 ml of benzene, 1.30 g of molybdenyl acetylacetonate, 75 g of hydrogen fluoride, and air was processed at 60° C and 2000 psi for eight hours as in Example 1, and the product was worked up by the method of Example 3, to give 8.71 g of poly(p-phenylene) as a light-brown powder. For a composite sample with a second product from an identical run, the average yield was 8.34 g (181% on p-terphenyl; 17.6 C—C per Mo); elemental composition, $C_{6.00}H_{4.17}F_{0.007}Mo_{0.0005}O_{0.08}$; ash, 0.14%; ir index, 807/765 = 2.12.

EXAMPLE 7

A mixture of 4.60 g of p-terphenyl, 25 ml of benzene, 75 g of hydrogen fluoride, 0.51 g of molybdenum dioxide, and oxygen was processed at 60° C and 300 psi for 16 hours by the method of Example 1, and the product was worked up by the method of Example 3, to give poly(p-phenylene) as a dark-brown powder. This product was combined with the product of an identical run. The average yield was 9.82 g (213% on p-terphenyl; 22.3 C—C per Mo).

The composite product had the elemental composition $C_{6.00}H_{3.94}F_{0.01}Mo_{0.002}O_{0.21}$, gave 0.92% ash, and had an ir index 806/766 = 3.71. DTA (20° C/min in argon) showed endothermal crests at 628° C, 720° C, and 773° C; TGA (6° C/min in air) showed 5% weight loss at 419° C, 10% at 474° C, and 50% at 85° C.

EXAMPLE 8

A mixture of 5.0 g of p-quaterphenyl, 25 ml of benzene, 0.58 g of molybdenum trioxide, 75 g of hydrogen fluoride, and oxygen was processed at 60° C and 400 psi for eight hours by the method of Example 2, and the product was worked up by essentially the method of Example 5, to give 12.90 g of poly(p-phenylene) as a gray powder. The product was combined with the product from an identical run to give a composite sample. The average yield was 12.90 g (258% on p-quaterphenyl; 30.3 C—C per Mo).

The composite product was further extracted with boiling water and then with benzene (98% recovery) essentially as described in Example 5. The product thus obtained had the elemental composition $C_{6.00}H_{3.98}F_{0.005}Mo_{0.02}O_{0.15}$, gave 0.99% ash, and had an ir index 805/765 = 4.16. DTA (20° C/min in argon) showed a small endothermal peak at 734° C as the only thermal transition to 800° C. TGA (6° C/min in air) showed 5% weight loss at 455° C, 10% at 513° C, and 50% at 937° C. Tensile bars were pressed to a thickness of 100 mils at 30 tons/in$^2$. They had a tensile strength of 1506 ± 352 psi, a tensile modulus of 468 ± 64 × 10$^3$ psi, and an elongation at break of 0.25 ± 0.08%.

The following experiment, which can be compared with Examples 2, 3, and 8, shows what happens when no arene other than benzene is used. A mixture of 25 ml of benzene, 0.58 g of molybdenum trioxide, 75 g of hydrogen fluoride, and oxygen was processed at 60° C and 400 psi for two hours by the method of Example 2. After cooling and evaporation, a small amount of black residual solid was obtained. This was combined with the products from four other identical experiments. The composite sample was leached with 400 ml of water, washed on the filter with four 100-ml portions of boiling water and then with four 100-ml portions of ethyl alcohol, triturated twice with 600-ml portions of boiling water, and dried in a vacuum oven overnight at 110° C. The average yield of black polymeric product per run was 0.98 g. In contrast, in Example 2, with the same catalyst concentration and reaction time, 3.72 g of the product was composed of phenylene units derived from benzene.

The composite product had an elemental composition of $C_{6.00}H_{3.33}F_{0.02}O_{0.67}$ and afforded 0.90% ash. The ir spectrum had significant absorption at 806, 760 (sh) and 749 cm$^{-1}$ and indicated little if any poly(p-phenylene). DTA (20° C/min in argon) revealed small endothermal events at 355° C, 464° C, and 710° C. TGA (6° C/min in air) revealed 5% weight loss at 422° C, 10% at 486° C, and 50% at 892° C.

EXAMPLE 9 p-Sexiphenyl was prepared essentially by the method of Kovacic and Lange, J. Org. Chem. 29, 2416 (1964), except that benzene was the solvent and the reaction temperature was 30° C. Purification by sublimation gave a pale-yellow powder, mp (DTA 20° C/min in argon) 450° C, ir index 810/760 = 1.06, elemental composition $C_{36.00}H_{26.04}$.

A mixture of 3.66 g of p-sexiphenyl, 25 ml of benzene, 0.44 g of molybdenyl acetylacetonate, 75 g of hydrogen fluoride, and oxygen was processed at 60° C and 300 psi for sixteen hours by the method of Example 1, and the product was worked up by the method of Example 3, to give 6.58 g of poly(p-phenylene) as a brown powder.

For characterization, the product was combined with poly(p-phenylene) from an identical experiment to form a composite sample. The average yield was 6.50 g (178% on p-sexiphenyl; 33.3 C—C per Mo); ir index 805/765 = 6.45, elemental composition $C_{6.00}H_{4.04}F_{0.012}Mo_{0.006}O_{0.14}$, 0.64% ash.

EXAMPLE 10

A mixture of 10.0 g of biphenyl, 1.30 g of molybdenyl acetylacetonate, 75 g of hydrogen fluoride, and oxygen was processed at 50° C and 300 psi for eight hours by the method of Example 1, and the product was worked up by the method of Example 3, to give 9.82 g of brown polymeric material.

For further characterization, this product was combined with the products from three other identical experiments to form a composite sample. The average yield was 9.48 g (95% on biphenyl); elemental composition $C_{6.00}H_{3.56}F_{0.01}Mo_{0.01}O_{0.16}$; 0.54% ash. The ir spectrum indicated little, if any, poly(p-phenylene) or p-sexiphenyl, although the ir index 806/754 was 1.00. DTA (20° C/min in argon) showed an exothermal crest at 329° C and an endothermal crest at 707° C as the only thermal events to 800° C.

Extraction with benzene followed by vacuum drying as described in Example 5 (85% recovery) raised the ir index 806/755 to 1.28 but did not appreciably affect other properties. TGA of the extracted product (6° C/min in air) showed 5% weight loss at 437° C, 10% at 492° C, and 50% at 918° C; softening point 280° C.

EXAMPLE 11

A mixture of 8.0 g of p-terphenyl, 1.30 g of molybdenyl acetylacetonate, 75 g of hydrogen fluoride, and oxygen was processed at 60° C and 400 psi for two hours by the method of Example 2, and the product was worked up by the method of Example 5, to give 7.73 g of a light-brown, powdery polymeric product.

For characterization, the product was combined with the products from two other identical runs to give a composite sample. The average yield was 7.89 g (99% on p-terphenyl). The composite product was further purified by extraction with water and then with benzene, essentially as described in Example 5 (97% recovery).

Elemental composition $C_{6.00}H_{4.21}F_{0.006}O_{0.09}$; 0.1% ash; ir index 814/760 = 1.29; DTA (20° C/min in argon), endothermal crests at 442° C, 535° C, and 646° C; TGA (6° C/min in air), 5% weight loss at 433° C, 10% at 479° C, and 50% at 773° C.

EXAMPLES 12–16

Table I summarizes experiments illustrating the catalytic activities of other molybdenum compounds in the process of the invention. In each example, except as noted under "Remarks", a mixture of the arene, 25 ml of benzene, the catalyst, 75 g of hydrogen fluoride, and oxygen were processed at 50° C and 300 psi for eight hours by the method of Example 1, and the product was worked up by the methods illustrated in Examples 1–5 with slight modifications in some instances.

two identical experiments (Examples 17, 18, 21, 22) to form a composite sample. The composite sample was triturated twice with 600 ml of boiling water and dried in a vacuum oven overnight at 110° C, after which it was characterized. DTA's were run at 20° C/min in argon. TGA's were run at 6° C/min in air; the table records the temperatures in ° C at which weight losses of 5%, 10%, and 50% were observed. The infrared spectra generally showed multiple aromatic absorption; the ir index is the ratio of the absorbance of the strongest peak near 810 cm$^{-1}$ to that of the strongest peak near 760 cm$^{-1}$ and is not, in general, a measure of the p-phenylene content of the polymer.

TABLE I

| Example | Arene g | Catalyst g | Yield g (%) | C-C per Mo | Elemental Composition | % Ash | IR Index | Remarks |
|---|---|---|---|---|---|---|---|---|
| 12 | biphenyl 3.08 | Mo(CO)$_6$ 1.06 | 4.74 (154) | 10.9 | C$_{6.00}$H$_{3.00}$F$_{0.01}$Mo$_{0.06}$O$_{0.25}$ | 2.13 | 806/759 = 2.07 | Data on composite of two runs |
| 13 | p-terphenyl 4.60 | Mo(CO)$_6$ 1.06 | 9.39 (204) | 21.5 | C$_{6.00}$H$_{4.03}$F$_{0.01}$Mo$_{0.03}$O$_{0.16}$ | 0.36 | 806/764 = 3.06 | Same; temp. 60° C |
| 14 | biphenyl 5.0 | [π-C$_5$H$_5$Mo(Co)$_3$]$_2$ 0.49 | 6.23 (125) | 24.8 | — | — | 810/760 = 1.6 | |
| 15 | biphenyl 5.0 | molybdic acid, MoO$_3$ · 2H$_2$O 0.68 | 7.65 (153) | 18.0 | — | — | 810/761 = 1.9 | |
| 16 | biphenyl 5.0 | ammonium molybdate, (NH$_4$)$_6$Mo$_7$O$_{24}$ · 4H$_2$O 0.35 | 7.47 (149) | 33.3 | — | — | 810/759 = 2.1 | |

TABLE II

Oxidative Polymerizations and Copolymerizations of Arenes Catalyzed by Molybdenyl Acetylacetonate

| Example | Arene | Benzene (25 ml.) | % Yield (on Arene) | elemental Composition | IR Index | DTA | TGA 5% | 10% | 50% |
|---|---|---|---|---|---|---|---|---|---|
| 17 | o-terphenyl | no | 98 | C$_{6.00}$H$_{3.75}$O$_{0.12}$F$_{0.01}$ 0.58% ash | 814/749 = 0.14 | endothermal peak, 356° C. small endothermal crests, 610° C., 720° C. | 533 | 574 | 1002 |
| 18 | o-terphenyl | yes | 113 | C$_{6.00}$H$_{3.83}$O$_{0.11}$F$_{0.003}$ 0.56% ash | 814/749 = 0.30 | small endothermal peaks, 321° C., 344° C. small endothermal crests, 407° C., 488° C., 622° C., 729° C. | 560 | 641 | 990 |
| 19 | m-terphenyl | no | 96 | C$_{6.00}$H$_{3.05}$O$_{0.18}$F$_{0.03}$ 0.62% ash | 792/755 = 0.32 | endothermal peak, 771° C., small endothermal crest, 536° C. | 453 | 512 | 925 |
| 20 | m-terphenyl | yes | 115 | C$_{6.00}$H$_{3.10}$O$_{0.14}$F$_{0.01}$ 0.64% ash | 804/750 = 0.39 | endothermal crests, 395° C. 518° C. | 526 | 615 | 946 |
| 21 | naphthalene | no | 108 | C$_{10.00}$H$_{4.62}$O$_{0.52}$F$_{0.08}$ 0.46% ash | 818/759 = 1.07 | endothermal crests, 602° C., 728° C. | 411 | 470 | 853 |
| 22 | naphthalene | yes | 142 | C$_{10.00}$H$_{5.25}$O$_{0.35}$F$_{0.04}$ 0.48% ash | 803/746 = 0.67 | exothermal crest, 441° C. endothermal crest, 760° C. | 419 | 467 | 833 |
| 23 | anthracene | no | 124 | C$_{14.00}$H$_{6.82}$O$_{1.80}$F$_{0.12}$ 0.76% ash | 808/755 = 0.39 | endothermal crests, 187° C., 669° C., 764° C. exothermal crest, 522° C. | 342 | 449 | 724 |
| 24 | anthracene | yes | 209 | C$_{14.00}$H$_{7.89}$O$_{0.62}$F$_{0.06}$ 0.40% ash | 807/748 = 0.38 | endothermal crests, 187° C. 337° C., 565° C. endothermal peak, 767° C. | 401 | 467 | 899 |

EXAMPLES 17–24

Table II summarizes examples illustrating the use of other arenes in the process of the invention, both alone and in copolymerizations with benzene. In each example, a mixture of 8 g of the arene, no benzene or 25 ml of benzene, as noted, 1.30 g of molybdenyl acetylacetonate, 75 g of hydrogen fluoride, and oxygen was processed at 60° C at 400 psi for two hours by the method of Example 2, and the product was worked up by the method of Example 5.

The product was combined with the product from an identical experiment (Examples 19, 20, 23, 24) or from

EXAMPLES 25–30

Table III summarizes examples illustrating copolymerizations of arenes other than benzene by the process of the invention. In each example, a mixture of the stated arenes, 1.30 g of molybdenyl acetylacetonate, 75 g of hydrogen fluoride, and oxygen was processed at 60° C and 300 psi for eight hours by the method of Example 1 and the product was worked up by the method of Example 3.

The product was combined with that from an identical experiment to form a composite sample which was characterized. The % yield was calculated on total arenes charged. Infrared spectra generally showed multiple aromatic absorption; the ir index is the ratio of the absorbance of the strongest peak near 810 cm$^{-1}$ to that of the strongest peak near 760 cm$^{-1}$ and is not, in general, a measure of the p-phenylene content of the polymer.

TABLE III

Oxidative Copolymerizations of Arenes Catalyzed by Molybdenyl Acetylacetonate

| Example | Arene 1 | Arene 2 | % Yield | Elemental Composition | IR Index |
|---|---|---|---|---|---|
| 25 | p-terphenyl 4.60 g. | biphenyl 6.16 g. | 104 | $C_{6.00}H_{3.67}O_{0.19}Mo_{0.02}F_{0.02}$ 0.74% ash | 805/760 = 2.45 |
| 26 | o-terphenyl 4.60 g. | biphenyl 6.16 g. | 98 | $C_{6.00}H_{3.38}O_{0.16}Mo_{0.006}F_{0.02}$ 1.00% ash | 808/751 = 0.55 |
| 27 | m-terphenyl 4.60 g. | biphenyl 6.16 g. | 94 | $C_{6.00}H_{3.17}O_{0.14}Mo_{0.004}F_{0.03}$ 0.22% ash | 808/757 = 0.66 |
| 28 | naphthalene 2.50 g. | biphenyl 6.16 g. | 80 | $C_{6.00}H_{3.31}O_{0.30}Mo_{0.02}F_{0.04}$ $C_{10.00}H_{5.51}O_{0.49}Mo_{0.03}F_{0.06}$ 0.48% ash | 805/751 = 0.94 |
| 29 | anthracene 3.56 g. | biphenyl 6.16 g. | 87 | $C_{6.00}H_{3.30}O_{0.30}Mo_{0.02}F_{0.04}$ $C_{14.00}H_{7.71}O_{0.70}Mo_{0.04}F_{0.09}$ 0.48% ash | 806/750 = 0.89 |
| 30 | m-terphenyl 4.60 g. | o-terphenyl 4.60 g. | 92 | $C_{6.00}H_{3.09}O_{0.21}Mo_{0.02}F_{0.05}$ | 805/751 = 0.70 |

EXAMPLE 31

A mixture of 4.60 g of terphenyl, 25 ml of benzene, 75 g of hydrogen fluoride, 0.58 g of molybdenum trioxide, and oxygen was processed at 50° C and 1000 psi by the method of Example 1, and the product was worked up by the method of Example 3, to give 11.30 g of poly(p-phenylene) as a brown-black powder. The product was combined with the product of an identical run. The average yield was 12.10 g (263% on p-terphenyl; 29.8 C—C per Mo).

The composite product had the elemental composition $C_{6.00}H_{3.94}O_{0.08}Mo_{0.002}F_{0.01}$ and an ir index 806/765 = 4.18. DTA (20° C/min in argon) showed a broad exothermal crest centered at about 481° C as the only thermal transition up to 800° C. TGA (6° C/min in air) showed 5% weight loss at 489° C, 10% at 527° C, 20% at 662° C, and 50% at 853° C.

The products of the invention, in powder form, are useful as solid lubricants, lubricant additives, pigments, oxidation inhibitors, stabilizers against heat and light, and laminate binders for heat shields. As shown in Examples 4 and 8, the products of the invention can be molded by conventional cold-pressing methods into shaped objects, which are useful as insulators and ablative materials.

The embodiments of this invention in which an exclusive property or privilege is claimed are defined as follows:

1. A process for the oxidative coupling of arenes to polymer, which comprises contacting and reacting at least one arene, in liquid hydrogen fluoride, with oxygen in the presence of a catalytic amount of up to about 0.25 mole of a molybdenum compound soluble in the reaction medium per mole of arene other than benzene; at a temperature between 0° and 120° C, with the proviso that at least 1/30 of the total arene is at least one arene having at least 10 carbon atoms.

2. Process of claim 1 wherein the temperature is from about 40° to 100° C.

3. Process of claim 2 wherein the partial pressure of oxygen is from about 100 to 2000 psi.

4. Process of claim 3 wherein said hydrogen fluoride is present in an amount of from about 5 to about 100 times the weight of arenes containing at least 10 carbon atoms.

5. The process of claim 4 wherein said catalyst is molybdenyl acetylacetonate.

6. The process of claim 4 wherein said catalyst is molybdenum trioxide.

7. The process of claim 4 wherein said catalyst is molybdenum hexacarbonyl.

8. The process of claim 4 wherein said catalyst is [II-C$_5$H$_5$Mo(CO)$_3$]$_2$.

9. The process of claim 4 wherein said catalyst is molybdenum dioxide.

* * * * *